(12) United States Patent
Gladden et al.

(10) Patent No.: US 8,297,053 B2
(45) Date of Patent: Oct. 30, 2012

(54) EXHAUST SYSTEM HAVING PARALLEL ASYMMETRIC TURBOCHARGERS AND EGR

(75) Inventors: John R. Gladden, Lafayette, IN (US); David Andrew Pierpont, Dunlap, IL (US); John P. Timmons, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 1081 days.

(21) Appl. No.: 12/222,008

(22) Filed: Jul. 31, 2008

(65) Prior Publication Data

US 2010/0024416 A1  Feb. 4, 2010

(51) Int. Cl.
*F02B 33/44* (2006.01)

(52) U.S. Cl. .......... 60/605.2; 60/612

(58) Field of Classification Search ........ 60/280, 60/302, 612, 605.1, 605.2, 602
See application file for complete search history.

(56) References Cited

U.S. PATENT DOCUMENTS

| | | |
|---|---|---|
| 3,423,926 A | 1/1969 | Nancarrow et al. |
| 3,559,397 A | 2/1971 | Navarro |
| 4,177,006 A | 12/1979 | Nancarrow |
| 4,179,892 A | 12/1979 | Heydrich |
| 4,474,006 A | 10/1984 | Price et al. |
| 4,526,004 A | 7/1985 | French et al. |
| 4,544,326 A | 10/1985 | Nishiguchi et al. |
| 4,611,465 A | 9/1986 | Kato et al. |
| 5,069,194 A | 12/1991 | Deutschmann et al. |
| 5,146,754 A | 9/1992 | Jain et al. |
| 5,611,202 A | 3/1997 | Sumser et al. |
| 5,611,203 A | 3/1997 | Henderson et al. |
| 5,740,785 A | 4/1998 | Dickey et al. |
| 5,791,146 A | 8/1998 | Dungner |
| 5,794,445 A * | 8/1998 | Dungner .......... 60/605.2 |
| 5,943,864 A | 8/1999 | Sumser et al. |
| 6,216,459 B1 | 4/2001 | Daudel et al. |
| 6,223,834 B1 | 5/2001 | Takamura et al. |
| 6,237,335 B1 | 5/2001 | Lönnqvist |
| 6,269,643 B1 | 8/2001 | Schmidt et al. |
| 6,286,312 B1 | 9/2001 | Bertilsson |
| 6,321,537 B1 | 11/2001 | Coleman et al. |
| 6,324,847 B1 | 12/2001 | Pierpont |
| 6,412,279 B1 | 7/2002 | Coleman et al. |
| 6,418,721 B1 | 7/2002 | Coleman et al. |
| 6,422,222 B1 | 7/2002 | Arbeiter et al. |
| 6,460,519 B1 | 10/2002 | Pierpont |
| 6,470,864 B2 | 10/2002 | Kim et al. |
| 6,484,499 B2 | 11/2002 | Coleman et al. |
| 6,672,061 B2 | 1/2004 | Schmid et al. |
| 6,675,782 B1 | 1/2004 | Persson |
| 6,694,735 B2 | 2/2004 | Sumser et al. |
| 6,715,288 B1 | 4/2004 | Engels et al. |
| 6,715,289 B2 | 4/2004 | Mader et al. |
| 6,751,956 B2 | 6/2004 | Mayer et al. |
| 6,918,251 B2 * | 7/2005 | Yanagisawa et al. ........ 60/605.2 |
| 7,013,879 B2 | 3/2006 | Brookshire et al. |

(Continued)

*Primary Examiner* — Mary A Davis

(74) *Attorney, Agent, or Firm* — Finnegan, Henderson, Farabow, Garrett & Dunner LLP

(57) ABSTRACT

An exhaust system for a use with a combustion engine is provided. The exhaust system may have a first exhaust manifold configured to receive exhaust from the engine, and a first turbocharger driven by exhaust from the first exhaust manifold. The exhaust system may also have a second exhaust manifold configured to receive exhaust from the engine in parallel with the first exhaust manifold, and a second turbocharger driven by exhaust from the second exhaust manifold and having a different flow capacity than the first turbocharger. The exhaust system may further have an exhaust gas recirculation circuit in fluid communication with the second exhaust manifold.

19 Claims, 2 Drawing Sheets

U.S. PATENT DOCUMENTS

| | | |
|---|---|---|
| 7,043,913 B2 | 5/2006 | Nishiyama et al. |
| 7,051,527 B2 | 5/2006 | Schmid et al. |
| 7,165,403 B2 | 1/2007 | Sun et al. |
| 7,165,540 B2 | 1/2007 | Brookshire et al. |
| 7,222,614 B2 | 5/2007 | Bryant |
| 7,287,378 B2 | 10/2007 | Chen et al. |
| 8,096,124 B2 * | 1/2012 | Pierpont et al. ............... 60/605.2 |
| 2004/0074480 A1 | 4/2004 | Chen et al. |
| 2005/0103013 A1 | 5/2005 | Brookshire et al. |
| 2006/0060173 A1 | 3/2006 | Wei et al. |
| 2006/0070382 A1 | 4/2006 | Karlsson |
| 2006/0101819 A1 * | 5/2006 | Schorn et al. ................... 60/602 |
| 2006/0123785 A1 | 6/2006 | Sundin et al. |
| 2006/0123787 A1 | 6/2006 | Gobert et al. |
| 2006/0123788 A1 | 6/2006 | Gobert et al. |
| 2006/0174621 A1 * | 8/2006 | Chen et al. ...................... 60/612 |
| 2007/0028901 A1 | 2/2007 | Watakabe et al. |
| 2007/0119171 A1 | 5/2007 | Boyapati et al. |
| 2007/0175215 A1 * | 8/2007 | Rowells ...................... 60/605.2 |
| 2007/0193270 A1 | 8/2007 | Roozenboom et al. |
| 2007/0193564 A1 | 8/2007 | Takahashi et al. |
| 2008/0000228 A1 | 1/2008 | Kieser |
| 2008/0000229 A1 | 1/2008 | Kuspert et al. |
| 2008/0271450 A1 * | 11/2008 | Dea et al. ........................ 60/602 |

* cited by examiner

EXHAUST SYSTEM HAVING PARALLEL ASYMMETRIC TURBOCHARGERS AND EGR

TECHNICAL FIELD

The present disclosure is directed to an exhaust system and, more particularly, to an exhaust system having parallel asymmetric turbochargers and exhaust gas recirculation (EGR).

BACKGROUND

Combustion engines such as diesel engines, gasoline engines, and gaseous fuel-powered engines are supplied with a mixture of air and fuel for combustion within the engine that generates a mechanical power output. In order to maximize the power output generated by this combustion process, the engine is often equipped with a divided exhaust manifold in fluid communication with a turbocharged air induction system.

The divided exhaust manifold increases engine power by helping to preserve exhaust pulse energy generated by the engine's combustion chambers. Preserving the exhaust pulse energy improves turbocharger operation, which results in a more efficient use of fuel. In addition, the turbocharged air induction system increases engine power by forcing more air into the combustion chambers than would otherwise be possible. This increased amount of air allows for enhanced fueling that further increases the power output generated by the engine.

In addition to the goal of maximizing engine power output and efficiency, it is desirable to simultaneously minimize exhaust emissions. That is, combustion engines exhaust a complex mixture of air pollutants as byproducts of the combustion process. And, due to increased attention on the environment, exhaust emission standards have become more stringent. The amount of pollutants emitted to the atmosphere from an engine can be regulated depending on the type of engine, size of engine, and/or class of engine.

One method that has been implemented by engine manufacturers to comply with the regulation of exhaust emissions includes utilizing an exhaust gas recirculating (EGR) system. EGR systems operate by recirculating a portion of the exhaust produced by the engine back to the intake of the engine to mix with fresh combustion air. The resulting mixture has a lower combustion temperature and, subsequently, produces a reduced amount of regulated pollutants.

EGR systems require a certain level of backpressure in the exhaust system to push a desired amount of exhaust back to the intake of the engine. And, the backpressure needed for adequate operation of the EGR system varies with engine load. Although effective, utilizing exhaust backpressure to drive EGR can adversely affect turbocharger operation, thereby reducing the air compressing capability of the air induction system. The reduced air compressing capability may, in turn, reduce the engine's fuel economy and possibly the amount of power generated by the engine. Thus, a system is required that provides sufficient exhaust backpressure to drive EGR flow without adversely affecting turbocharger or engine operation.

U.S. Patent Publication No. 2006/0174621 by Chen et al. published Aug. 10, 2006 (the '621 publication) discloses an internal combustion engine having a first turbocharger in fluid communication with a first exhaust manifold and fluidly communicating with an intake manifold, and a second similar turbocharger in fluid communication with a second exhaust manifold and fluidly communicating with the intake manifold in parallel with the first turbocharger. A crossover passage connects the first exhaust manifold to the second exhaust manifold, and a first exhaust gas control valve is located within the crossover passage to control communication between the first and second exhaust manifolds by way of the crossover passage. A second exhaust gas control valve is disposed between the second turbocharger and the second exhaust manifold at a location downstream of the crossover passage.

The engine described in the '621 publication is also provided with an EGR system including an EGR cooler connected in series with an EGR valve. A first EGR check valve and a second EGR check valve are disposed at a gas inlet side of the EGR cooler to allow exhaust from the first and second exhaust manifolds to recirculate back into the engine for subsequent combustion.

During operation of the engine described in the '621 publication, the first and second exhaust gas control valves are opened or closed based on operating conditions of the engine. By closing the first exhaust gas control valve and opening the second exhaust gas control valve, the first and second turbochargers operate similarly in parallel fashion to provide adequate boost and EGR back pressure at high engine speeds. By opening the first exhaust gas control valve and closing the second exhaust gas control valve, the second turbocharger is disabled at low engine speeds and exhaust from both the first and second exhaust manifolds passes through the first turbocharger by way of the crossover passage. This latter arrangement increases backpressure at low engine speeds such that EGR remains functional and adequate boost is provided.

Although the system of the '621 publication may adequately control exhaust gas recirculation in a turbocharged engine, it may be complicated and inefficient. Specifically, the system of the '621 publication requires complex valving and control mechanisms to change exhaust flow paths based on engine conditions. And, the system of the '621 patent requires the exhaust back pressure of all cylinders to be greater than the intake manifold pressure in order to achieve sufficient EGR flow. By applying backpressure to all cylinders, the engine efficiency may be compromised.

The disclosed exhaust system is directed to overcoming one or more of the problems set forth above and/or other problems of the prior art.

SUMMARY

In one aspect, the disclosure is directed toward an exhaust system for an engine. The exhaust system may include a first exhaust manifold configured to receive exhaust from the engine, and a first turbocharger driven by exhaust from the first exhaust manifold. The exhaust system may also include a second exhaust manifold configured to receive exhaust from the engine in parallel with the first exhaust manifold, and a second turbocharger driven by exhaust from the second exhaust manifold and having a different flow capacity than the first turbocharger. The exhaust system may further include an exhaust gas recirculation circuit in fluid communication with the second exhaust manifold.

In another aspect, the disclosure is directed toward a method of handling exhaust from an engine. The method may include receiving exhaust from a first plurality of combustion chambers, and removing energy from exhaust received from the first plurality of combustion chambers. The method may also include receiving exhaust from a second plurality of combustion chambers, directing a portion of the exhaust received from the second plurality of combustion chambers back into the engine for subsequent combustion, and removing energy from a remaining portion of the exhaust received from the second plurality of combustion chambers in parallel with removing energy from the exhaust received from the first plurality of combustion chambers. Removing energy from the remaining portion of the exhaust may increase a pressure of the exhaust received from the second plurality of combustion chambers by an amount greater than a pressure increase of the exhaust received from first plurality of combustion chambers caused by removing energy.

DETAILED DESCRIPTION

Figure 1:
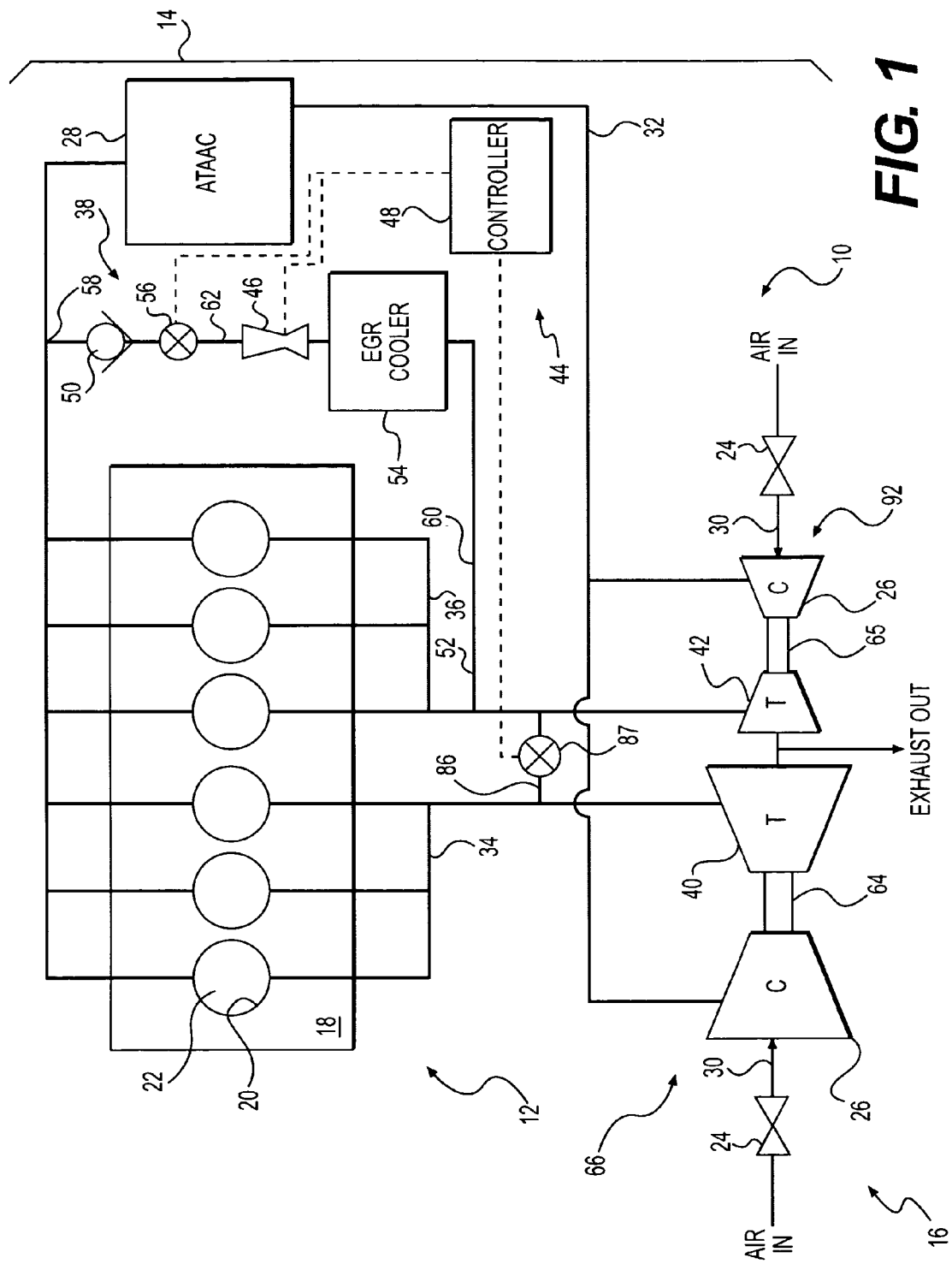
FIG. 1 is a schematic illustration of an exemplary disclosed power system.

FIG. 1 illustrates a power system 10 having a power source 12, an air induction system 14, and an exhaust system 16. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Cylinder 20, the piston, and the cylinder head may form a combustion chamber 22. In the illustrated embodiment, power source 12 includes six such combustion chambers 22 arranged in an in-line configuration. However, it is contemplated that power source 12 may include a greater or lesser number of combustion chambers 22, if desired.

Air induction system 14 may include components configured to introduce charged air into power source 12. For example, air induction system 14 may include one or more induction valves 24, two or more compressors 26, and an air cooler 28. Induction valves 24 may be connected upstream of compressors 26 via fluid passageway 30 and configured to regulate the flow of atmospheric air to power source 12. Each compressor 26 may embody a fixed geometry compressor, a variable geometry compressor, or any other type of compressor configured to receive air from induction valve 24 and compress the air to a predetermined pressure level before it enters power source 12. Compressors 26 may be disposed in a parallel relationship and connected to power source 12 via a fluid passageway 32. Air cooler 28 may embody an air-to-air heat exchanger, an air-to-liquid heat exchanger, or a combination of both, and be configured to facilitate the transfer of thermal energy to or from the compressed air directed into power source 12. Air cooler 28 may be disposed within fluid passageway 32, between power source 12 and compressors 26.

Exhaust system 16 may include components configured to direct exhaust from power source 12 to the atmosphere. Specifically, exhaust system 16 may include first and second exhaust manifolds 34 and 36 in communication with combustion chambers 22, an exhaust gas recirculation (EGR) circuit 38 fluidly communicating second exhaust manifold 34 with air induction system 14, first and second turbines 40 and 42 associated with first and second exhaust manifolds 34, 36, and a control system 44 for regulating flows from exhaust system 16 to air induction system 14. It is contemplated that exhaust system 16 may include components in addition to those listed above such as, for example, particulate traps, constituent absorbers or reducers, and attenuation devices, if desired.

Exhaust produced during the combustion process within combustion chambers 22 may exit power source 12 via either first exhaust manifold 34 or second exhaust manifold 36. First exhaust manifold 34 may fluidly connect a first plurality of combustion chambers 22 of power source 12 (e.g., the first three combustion chambers 22 shown from the left in FIG. 1) to first turbine 40. Second exhaust manifold 36 may fluidly connect a second plurality of combustion chambers 22 of power source 12 (e.g., the final three combustion chambers shown from the left in FIG. 1) to first turbine 40.

EGR circuit 38 may include components that cooperate to redirect a portion of the exhaust produced by power source 12 from first exhaust manifold 34 to air induction system 14. Specifically, EGR circuit 38 may include an inlet port 52, an EGR cooler 54, a recirculation control valve 56, and a discharge port 58. Inlet port 52 may be fluidly connected to second exhaust manifold 36 upstream of second turbine 42 and fluidly connected to EGR cooler 54 via a fluid passageway 60. Discharge port 58 may receive exhaust from EGR cooler 54 via a fluid passageway 62, and discharge exhaust to air induction system 14 at a location upstream or downstream of air cooler 28. Recirculation control valve 56 may be disposed within fluid passageway 62, between EGR cooler 54 and discharge port 58. It is further contemplated that a check valve, for example a reed-type check valve 50 may be situated within fluid passageway 62 upstream or downstream of recirculation control valve 56 at a location where exhaust mixes with inlet air to provide for a unidirectional flow of exhaust through EGR circuit 38 (i.e., to inhibit bidirectional exhaust flows through EGR circuit 38).

Recirculation control valve 56 may be located to control the recirculated flow of exhaust through EGR circuit 38. Recirculation control valve 56 may be any type of valve known in the art such as, for example, a butterfly valve, a diaphragm valve, a gate valve, a ball valve, a poppet valve, or a globe valve. In addition, recirculation control valve 56 may be solenoid-actuated, hydraulically-actuated, pneumatically-actuated or actuated in any other manner to selectively restrict or completely block the flow of exhaust through fluid passageways 60 and 62.

EGR cooler 54 may be configured to cool exhaust flowing through EGR circuit 38. EGR cooler 54 may include a liquid-to-air heat exchanger, an air-to-air heat exchanger, or any other type of heat exchanger known in the art for cooling an exhaust flow.

First turbine 40 may be a single volute turbine configured to receive exhaust from first exhaust manifold 34 and drive one or more of compressors 26. For example, first turbine 40 may be directly and mechanically connected to one of compressors 26 by way of a shaft 64 to form a first turbocharger 66. As the hot exhaust gases exiting power source 12 move through first turbine 40 and expand against blades (not shown) therein, first turbine 40 may rotate and drive the connected compressor 26 to pressurize air directed into power source 12. In one embodiment, first turbine 40 may be a variable geometry turbine having an adjustable nozzle ring or adjustable vane members, if desired.

Second turbine 42 may also be connected to one of compressors 26 to form a fixed or variable geometry turbocharger 92. For example, second turbine 42 may be directly and mechanically connected to one of compressors 26 by way of a shaft 65 to form second turbocharger 92. In the depicted arrangement, second turbine 42 may be a single volute turbine situated to receive exhaust from second manifold 36. As the hot exhaust gases exiting power source 12 move through second turbine 42 and expand against blades (not shown) therein, second turbine 42 may rotate and drive the connected compressor 26 to pressurize air directed into power source 12.

Second turbocharger 92 may be sized differently than first turbocharger 66 (i.e., first and second turbochargers 66, 92 may be asymmetric). Specifically, second turbocharger 92 may restrict exhaust flow to a degree greater (i.e., have a lower flow capacity) than first turbocharger 66. This substantially decreased flow capacity may work to increase the back pressure within second exhaust manifold 36 by an amount greater than the pressure within first exhaust manifold 34. The increased back pressure of second exhaust manifold 36 may help force exhaust through EGR circuit 38 and back into power source 12 for subsequent combustion. In one example, the decreased flow capacity of second turbocharger 92 may be due to a decreased cross-sectional flow area or area/radius (A/R) ratio at a housing opening of second turbine 42. In another example, the decreased flow capacity may be due to a smaller volute area or A/R ratio, turbine wheel diameter, trim profile, or nozzle vane orientation or setting than that of first turbine 40. It is contemplated that other ways of providing the decreasing the flow capacity of second turbine 42 may also be possible.

A balance passageway 86 and associated balance valve 87 may also be included within exhaust system 16 and utilized to fluidly communicate exhaust from second exhaust manifold 36 with first exhaust manifold 34. Balance valve 87 may be disposed within balance passageway 86 and configured to regulate the pressure of exhaust flowing through second exhaust manifold 36 by selectively allowing exhaust to flow from second exhaust manifold 36 to first exhaust manifold 34 (i.e., by selectively adjusting a restriction placed on the flow through balance passageway 86). It should be understood that the pressure within second exhaust manifold 36 may affect the amount of exhaust directed through EGR circuit 38. That is, when a greater amount of exhaust flows from second exhaust manifold 36 to first exhaust manifold 34 by way of balance passageway 86, a pressure within second exhaust manifold 36 may be reduced and, as a result, an amount of exhaust passing from second exhaust manifold 36 through EGR circuit 38 may be reduced proportionally.

Balance valve 87 may be any type of valve such as, for example, a butterfly valve, a diaphragm valve, a gate valve, a ball valve, a globe valve, a poppet valve, or any other valve known in the art. Furthermore, balance valve 87 may be solenoid-actuated, hydraulically-actuated, pneumatically-actuated or actuated in any other manner to selectively restrict or completely block the flow of exhaust between first and second exhaust manifolds 34, 36.

Control system 44 may include components that function to regulate the flow rate and pressure of exhaust passing though second exhaust manifold 36 and, subsequently, the flow rate and pressure of exhaust directed through EGR circuit 38 by adjusting second turbine 42, recirculation control valve 56, and/or balance valve 87 in response to sensory input. Specifically, control system 44 may include a sensor 46 and a controller 48 in communication with sensor 46, second turbine 42, recirculation control valve 56, and balance valve 87. Based on signals received from sensor 46, controller 48 may adjust the geometry of second turbine 42 or a restriction provided by recirculation control valve 56 and/or balance valve 87.

It is contemplated that, in some embodiments, control system 44 may be used to also regulate turbocharger performance such as boost and/or speed of one or both of first and second turbochargers 66 and 92. In this arrangement, the sensory input might be used by controller 48 to determine appropriate response of recirculation control valve 56, balance valve 87, and/or turbocharger components to meet desired performance and/or emission parameters.

Although shown as located downstream of EGR cooler 54 and upstream of recirculation control valve 56, sensor 46 may alternatively be located anywhere within EGR circuit 38 and embody, for example, a mass air flow sensor such as a hot wire anemometer or a venturi-type sensor configured to sense pressure and/or a flow rate of exhaust passing through EGR circuit 38. Controller 48 may use signals produced by sensor 46 to determine and/or adjust a backpressure within second exhaust manifold 36 such that a desired amount of exhaust is recirculated back into power source 12 for subsequent combustion or a desired turbo boost or speed is maintained. This adjustment of pressure will be further explained in more detail below.

Controller 48 may embody a single or multiple microprocessors, field programmable gate arrays (FPGAs), digital signal processors (DSPs), etc. that include a means for controlling an operation of power system 10 in response to signals received from sensor 46. Numerous commercially available microprocessors can be configured to perform the functions of controller 48. It should be appreciated that controller 48 could readily embody a microprocessor separate from that controlling other non-exhaust related power system functions, or that controller 48 could be integral with a general power system microprocessor and be capable of controlling numerous power system functions and modes of operation. If separate from a general power system microprocessor, controller 48 may communicate with the general power system microprocessor via data links or other methods. Various other known circuits may be associated with controller 48, including power supply circuitry, signal-conditioning circuitry, actuator driver circuitry (i.e., circuitry powering solenoids, motors, or piezo actuators), communication circuitry, and other appropriate circuitry.

Before regulating the flow of exhaust through EGR circuit 38 and turbochargers 66 and 92, controller 48 may first receive data indicative of an operational condition of power source 12, a desired exhaust flow rate, or a desired turbo speed. Such data may be received from another controller or computer (not shown). In an alternative embodiment, operational condition data may be received from sensors strategically located throughout power system 10. Controller 48 may then utilize stored algorithms, equations, subroutines, look-up maps and/or tables to analyze the operational condition data and determine a corresponding desired exhaust pressure, flow rate through EGR circuit 38, and/or speed of turbochargers 66 and 92.

Controller 48 may also receive signals from sensor 46 indicative of the flow rate or pressure of exhaust passing through second exhaust manifold 36. Upon receiving input signals from sensor 46, controller 48 may perform operations utilizing stored algorithms, equations, subroutines, look-up maps and/or tables to determine whether an actual flow rate or pressure of exhaust flowing through second exhaust manifold 36 is within a range required to produce the desired exhaust flow rate through EGR circuit 38 and turbines 40 and 42. In an alternate embodiment, it is contemplated that controller 48 may receive signals from various sensors (not shown) located throughout exhaust system 16 and/or power system 10 instead of sensor 46. Such sensors may sense parameters that may be used to calculate the flow rate or pressure of exhaust flowing through first exhaust manifold 34, if desired.

Based on the comparison of the actual EGR flow rate or turbo speeds with the desired range of flow rates or speeds, controller 48 may adjust operation of exhaust system 16. That is, controller 48 may adjust the geometry of first or second turbocharger 66, 92, operation of balance valve 87, and/or operation of recirculation control valve 56 to affect the pressure within second exhaust manifold 36 and the resulting flow rate of exhaust through EGR circuit 38 and turbochargers 66 and 92. In one embodiment, controller 48 may primarily adjust operation of balance valve 87 to achieve the desired flow rate of exhaust through EGR circuit 38. After balance valve 87 has been adjusted to a maximum or minimum position, controller 48 may then adjust operation of recirculation control valve 56 to provide further exhaust recirculation modulation.

Figure 2:
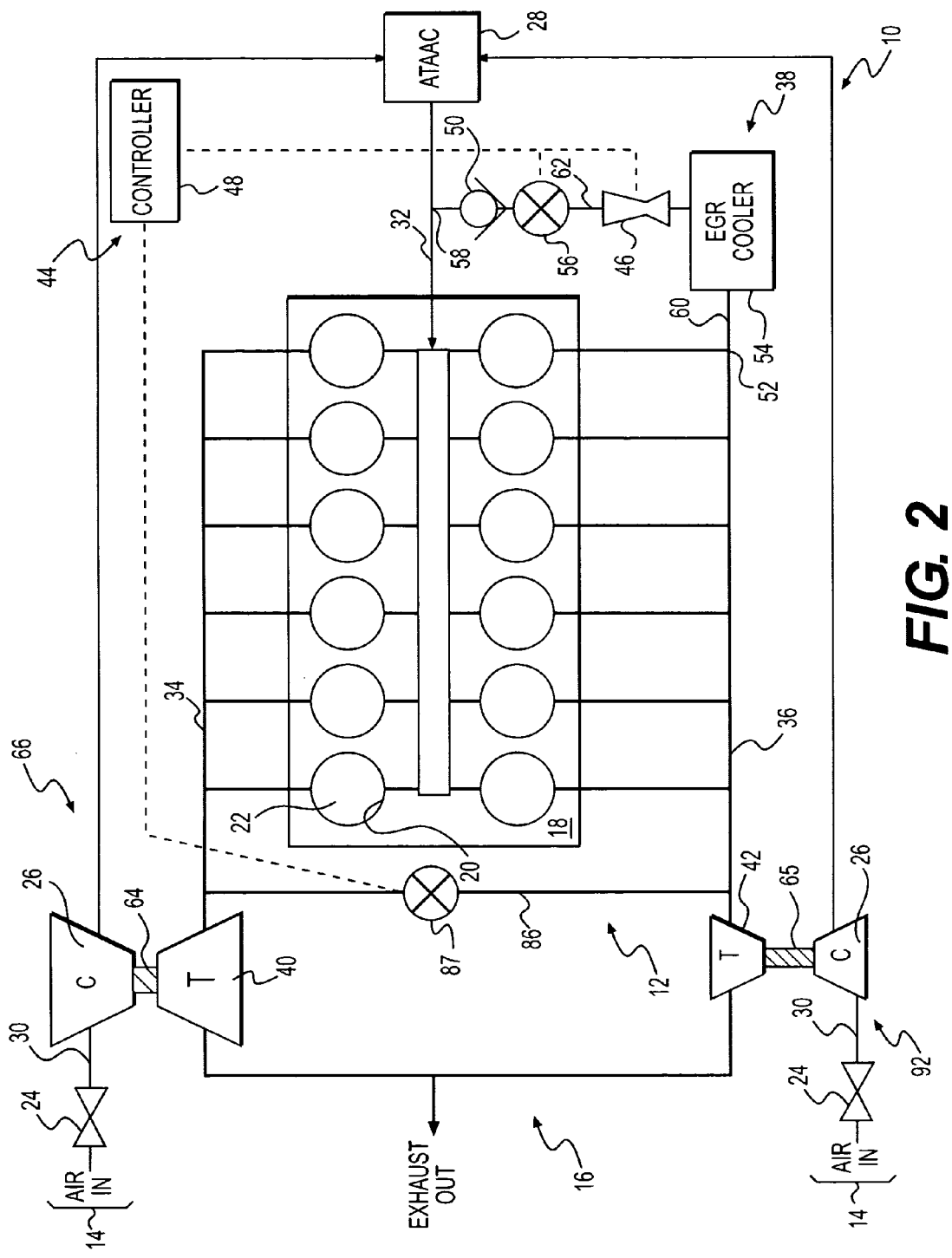
FIG. 2 is a schematic illustration of another exemplary disclosed power system.

FIG. 2 illustrates an alternative embodiment of power system 10. In this embodiment, power source 12 may be arranged in a V-configuration. As such, combustion chambers 22 may be aligned in two rows or banks, with first turbocharger 66 being associated with a first bank of combustion chambers 22 and second turbocharger 92 being associated with a second bank of combustion chambers 22.

Industrial Applicability

The disclosed exhaust system may be implemented into any power system application where charged air induction and exhaust gas recirculation are utilized. The disclosed exhaust system may be suitable for both high- and low-boost applications, be simple, and offer enhanced efficiency. Specifically, the asymmetric sizing of first and second turbochargers 66, 92 may offer adequate boosting at both low and high engine speeds, without the need for extensive valving and flow path changing. Further, because exhaust system 16 may maintain a level of separation between first and second exhaust manifolds 34, 36, the exhaust pulse preservation provided by divided manifolds may also be maintained. Also, the disclosed exhaust system may allow for one bank of combustion chambers 22 to operate at a substantially lower back pressure than an intake of power system 10, while still providing sufficient EGR flow from the remaining bank of combustion chambers 22 to meet low emissions requirements. By not having to increase the back pressure of all combustion chambers 22, engine efficiency may be improved. In addition, the location of recirculation control valve 56, sensor 46, and check valve 50 downstream of EGR cooler 54 may result in cool operating temperatures of those components and extended component lives. Finally, by utilizing direct flow, boost, and/or turbo speed sensing and feedback control, precise regulation of exhaust recirculation and air induction system 14 may be possible.

It will be apparent to those skilled in the art that various modifications and variations can be made to the disclosed exhaust system. Other embodiments will be apparent to those skilled in the art from consideration of the specification and practice of the disclosed exhaust system. It is intended that the specification and examples be considered as exemplary only, with a true scope being indicated by the following claims and their equivalents.

What is claimed is:

1. An exhaust system for an engine, comprising:
a first exhaust manifold configured to receive exhaust from the engine;
a first turbocharger driven by exhaust from the first exhaust manifold;
a second exhaust manifold configured to receive exhaust from the engine in parallel with the first exhaust manifold;
a second turbocharger driven by exhaust from the second exhaust manifold and having a different flow capacity than the first turbocharger;
a balancing valve upstream of the first and second turbochargers; and
an exhaust gas recirculation circuit initiating upstream of the balancing valve from only a single exhaust line, the single exhaust line extending from the second exhaust manifold.

2. The exhaust system of claim 1, further including,
a passageway connecting the first and second exhaust manifolds,
the balancing valve being located within the passageway to selectively restrict a flow of exhaust through the passageway.

3. The exhaust system of claim 2, further including a control valve located within the exhaust gas recirculation circuit to regulate a flow of exhaust directed through the exhaust gas recirculation circuit.

4. The exhaust system of claim 3, further including a check valve located within the exhaust gas recirculation circuit to provide for a unidirectional flow of exhaust through the exhaust gas recirculation circuit.

5. The exhaust system of claim 4, wherein the check valve is located downstream of the control valve at a location where exhaust mixes with inlet air.

6. The exhaust system of claim 3, further including a cooler located within the exhaust gas recirculation circuit upstream of the control valve.

7. The exhaust system of claim 6, further including:
a flow sensor located downstream of the cooler; and
a controller in communication with the flow sensor, the control valve, and the balancing valve, the controller being configured to regulate operation of the control valve and the balancing valve in response to input from the flow sensor.

8. The exhaust system of claim 7, wherein the flow sensor is located upstream of the control valve.

9. The exhaust system of claim 1, wherein the exhaust gas recirculation circuit is in fluid communication with only the second exhaust manifold.

10. A method of handling exhaust from an engine, comprising:
receiving exhaust from a first plurality of combustion chambers;
removing energy from exhaust received from the first plurality of combustion chambers;
receiving exhaust from a second plurality of combustion chambers;
directing a portion of the exhaust received from the second plurality of combustion chambers through an EGR circuit back into the engine for subsequent combustion; the EGR circuit initiating upstream of a balance valve from only a single exhaust line, the single exhaust line extending from the second plurality of combustion chambers;
removing energy from a remaining portion of the exhaust received from the second plurality of combustion chambers in parallel with removing energy from the exhaust received from the first plurality of combustion chambers,
wherein removing energy from the remaining portion of the exhaust increases a pressure of the exhaust received from the second plurality of combustion chambers by an amount greater than a pressure increase of the exhaust received from the first plurality of combustion chambers caused by removing energy;
sensing a flow rate of the portion of the exhaust directed back into the engine; and adjusting a restriction placed on a flow of the exhaust received from the second plurality of combustion chambers based on the sensed flow rate.

11. The method of claim 10, wherein the pressure increase of the exhaust received from the second plurality of combustion chambers forces exhaust to flow from the second plurality of combustion chambers back into the engine.

12. The method of claim 11, further including selectively passing exhaust received from the second plurality of combustion chambers to mix with exhaust received from the first plurality of combustion chambers before removing energy, wherein the selective passing reduces an amount of exhaust directed back into the engine.

13. The method of claim 10, further including selectively restricting the portion of the exhaust directed back into the engine.

14. The method of claim 13, further including inhibiting bidirectional flows of the portion of the exhaust directed back into the engine.

15. The method of claim 13, further including cooling the portion of the exhaust directed back to the engine before the portion of the exhaust is selectively restricted.

16. The method of claim 15, further including,
adjusting the restriction of the portion of the exhaust directed back into the engine based on the sensed flow rate.

17. The method of claim 16, wherein the restriction of the exhaust received from the second plurality of combustion chambers is adjusted to a fullest extent possible before the restriction of the portion of the exhaust directed back into the engine is adjusted.

18. A power system, comprising:
a combustion engine having a first plurality of combustion chambers and a second plurality of combustion chambers;
a first exhaust manifold configured to receive exhaust from the combustion engine;
a first turbocharger driven by exhaust from the first exhaust manifold;
a second exhaust manifold configured to receive exhaust from the combustion engine in parallel with the first exhaust manifold;
a second turbocharger driven by exhaust from the second exhaust manifold and having a lower flow capacity than the first turbocharger;
an exhaust gas recirculation circuit in fluid communication with the second exhaust manifold;
a passageway connecting the first and second exhaust manifolds;
a balancing valve located within the passageway to selectively restrict a flow of exhaust through the passageway; and
a control valve located within the exhaust gas recirculation circuit to regulate a flow of exhaust directed through the exhaust gas recirculation circuit.

19. The power system of claim 18, wherein the exhaust gas recirculation circuit initiates upstream of the second turbocharger.

* * * * *